W. E. TAYNTON.
VEHICLE SIGNAL.
APPLICATION FILED NOV. 30, 1917.
1,355,578.
Patented Oct. 12, 1920.
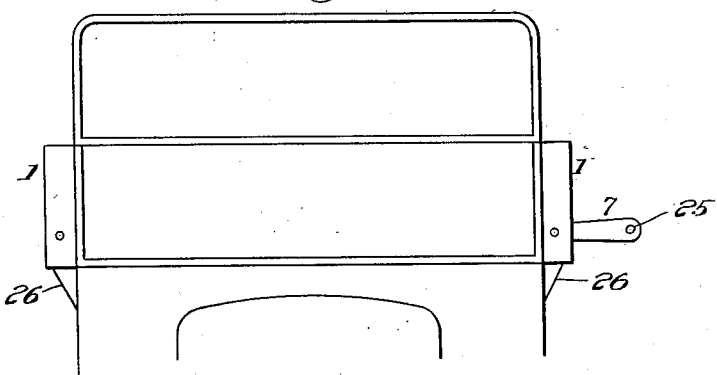
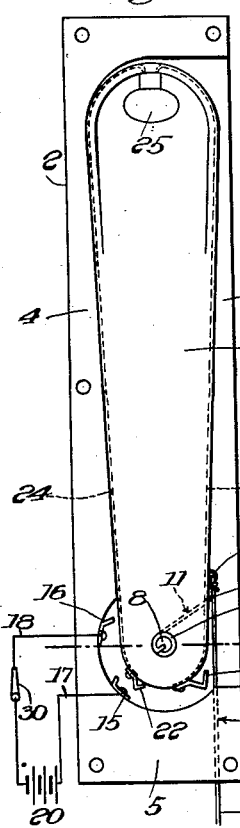
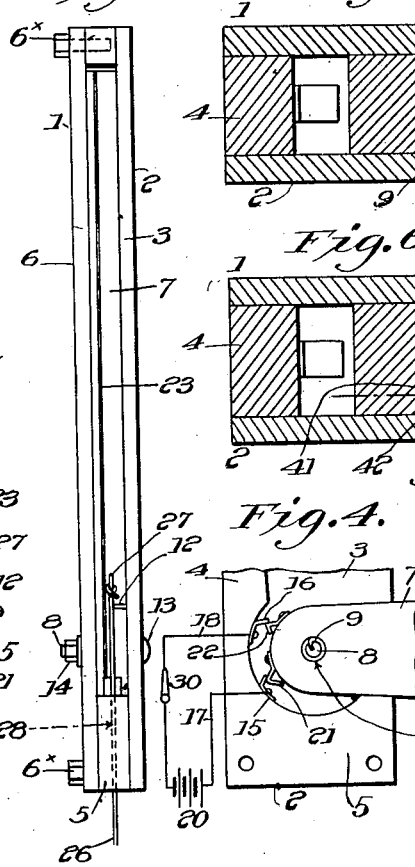
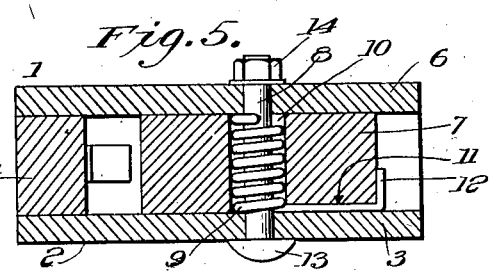
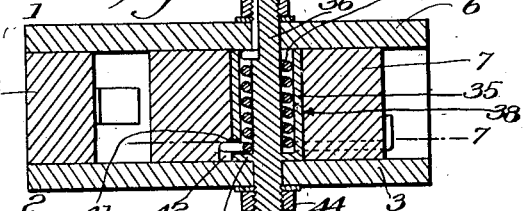
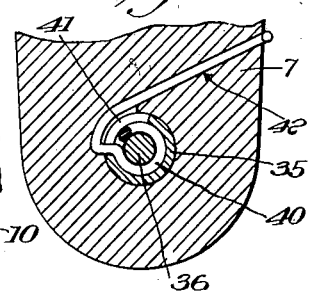
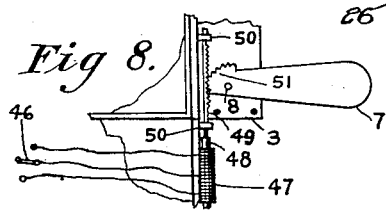
INVENTOR
Walter E. Taynton
BY
Harry C. Schroeder
ATTORNEY

UNITED STATES PATENT OFFICE.

WALTER E. TAYNTON, OF OAKLAND, CALIFORNIA.

VEHICLE-SIGNAL.

1,355,578.  Specification of Letters Patent.  Patented Oct. 12, 1920.

Application filed November 30, 1917. Serial No. 204,508.

*To all whom it may concern:*

Be it known that I, WALTER E. TAYNTON, citizen of the United States, residing at Oakland, in the county of Alameda and State of California, have invented certain new and useful Improvements in Vehicle-Signals, of which the following is a specification.

This invention is an improved automobile signal for indicating a maneuver of the automobile.

The invention is illustrated in the accompanying drawing which forms a part of this specification and the appended claims.

Referring to the drawing:

Figure 1 is a view of the front portion of an automobile with my signal attached thereto.

Fig. 2 is an enlarged front elevation of the signal with the front wall thereof removed, the signaling arm being shown within the casing in non-signaling position.

Fig. 3 is a side view of the signal.

Fig. 4 is a fragmentary view of the lower part of the signal, with the signal arm in signaling position and the light circuit switch closed.

Fig. 5 is a cross sectional view of the signal taken on line 5 of Fig. 2.

Fig. 6 is a view similar to Fig. 5 of a modified form of pivot for the signal arm.

Fig. 7 is a sectional view, of the structure shown in Fig. 6 taken on line 7 of said figure.

Fig. 8 is a fragmentary view showing the signal operated by another means.

Numeral 1 indicates a signal casing which is adapted to be secured in a conspicuous place on an automobile such as on the wind shield, as shown in Fig. 1. The casing comprises a base 2, which has a rear wall 3, one side wall 4, bottom wall 5, and detachable front wall 6; the side of the casing opposite side wall 4 being open. The front wall 6 is detachably secured to the base 2 by bolts 6ˣ. Within the casing a signal arm 7 is pivoted on pivot pin 8 and a coil spring 9 coiled around the pin which extends through the walls 6 and 3 of the casing near the bottom thereof, and through an opening 10 in the lower end of the signal arm; the spring 9 fitting the wall of the opening 10 and the arm turning on the spring.

One end of the spring 9 extends through an angular groove 11 in the rear surface of the arm 7 and its extremity 12 extends forwardly into engagement with one edge of the arm, while the other end of said spring connects to the pin 8. The pin has a head 13 on its rear end which engages the outside of the rear casing wall 3 and a nut 14 screws on the front end of the pin against the front casing wall 6 to hold the pin in position in the casing and arm. A pair of contacts 15 and 16 are secured to the side wall 4 within the casing near the bottom thereof, to which are connected leads 17 and 18 of an electric light circuit which includes a battery 20. Contacts 21 and 22 are secured to the lower end of the arm 7 to which contacts are connected leads 23 and 24 of the electric light circuit which extend through grooves in the side edges of the signal arm and connects to the terminals of an electric light 25 located in the upper swinging end of said arm. A cord 26 is connected at 27 to one edge of the signal arm and extends through a hole 28 in the lower casing wall 5, by means of which cord the signal arm may be pulled downwardly and swung down on its pivot through the open side of the casing into signaling position to indicate a maneuver of the automobile. When the signal has been swung down and has signaled the maneuver of the automobile the spring 9 swings the arm back up into the casing into non-signaling position.

A switch 30 is provided in the light circuit for controlling the circuit. In the daytime the switch is open, while during the night the switch is closed, closing the light circuit so that when the arm is swung down into signaling position to give a signal the contacts 21 and 22 respectively contact with contacts 15 and 16 and close the light circuit and light the light so that the arm may be seen.

In modified pivot and spring structure shown in Figs. 6 and 7, a cylindrical cup pivot 35 surrounds and is formed integral with a pin 36. Said pin extends through the walls 3 and 6 of the casing 1, and the end wall 37 of the cup pivot forms a shoulder and rests against the inside of the wall 3, and positions the pivot for the signal arm 7, which arm has a cylindrical opening 38 through which said cup pivot extends, upon which cup pivot the arm is pivoted to swing from non-signaling position and vice versa.

A spring 40 surrounds the pin 36 within the cup pivot 35, one end of the spring extending through a slot 41 in the cup pivot adjacent the end wall thereof and through a groove 42 in the arm and against the side of the arm, and the other end of the spring extending into an axial groove 43 in the end of the pin 36 corresponding to the open end of the cup pivot, the tension of the spring being adapted to hold the signaling arm in non-signaling position. The ends of the pin are threaded to receive nuts 44 and 45 which screw against the walls 3 and 6 and hold the pivot within the arm.

In that modification of my device shown in Fig. 8, the signal arm 7 is actuated from a remote place by means of a switch 46 which closes either one of two circuits of a solenoid 47, the piston rod 48 of which is connected with and actuates a rack 49 slidable in bearings 50 attached to the casing of the signal. The rack 49 meshes with a segmental gear 51 formed integral with the signal arm 7.

Having described my invention, I claim as new and desire to secure by Letters Patent:

1. A signal comprising a signaling arm, a pivot extending through said arm upon which the arm is pivoted, said pivot comprising a cylindrical cup-shaped shell and a pin extending through and integral with said shell, a coil spring coiled around said pin within said shell, a slot in said shell through which one end of said spring projects, said projecting end of said spring being connected to said signaling arm, the other end of said spring being connected to said pin, and means for supporting said pin.

2. A signal comprising a casing, one wall of said casing being detachably secured to the rest of the casing, a signaling arm fitting in said casing, a pivot pin extending through said detachable wall and an opposite wall of said casing and through said pivot arm for pivoting the arm within the casing, a head on one end of said pin engaging said opposite wall of the casing, and a nut screwing on the other end of said pin against said detachable wall of the casing to hold the pivot in position, a spring coiled around said pivot pin detachably connected at one end to said arm and connected at its other end to said pin.

3. A signal comprising a casing, one wall of said casing being detachable, a signaling arm fitting within said casing, a pivot pin the ends of which extend through one rigid wall of the casing and through said detachable wall thereof, nuts screwing on the ends of said pivot pin against said walls to hold said pivot pin in position, a cylindrical shell surrounding and formed integral with said pivot pin and extending through said arm and upon which said arm is pivoted, a coil spring coiled around said pivot within said shell, said shell being provided with a slot through which one end of said spring projects, said projecting end of the spring being connected to said arm, an axial slot in the end of said pin, which projects through said detachable wall the other end of the spring being adapted to fit within said slot, so that the spring will normally maintain the arm in non-signaling position within the casing, and means for swinging said arm out of the casing into signaling position.

In testimony whereof I affix my signature.

WALTER E. TAYNTON.